Feb. 18, 1941.  C. E. MELKER  2,232,182
CROSSHEAD AND PISTON ROD CONNECTION
Filed July 3, 1939   2 Sheets-Sheet 1
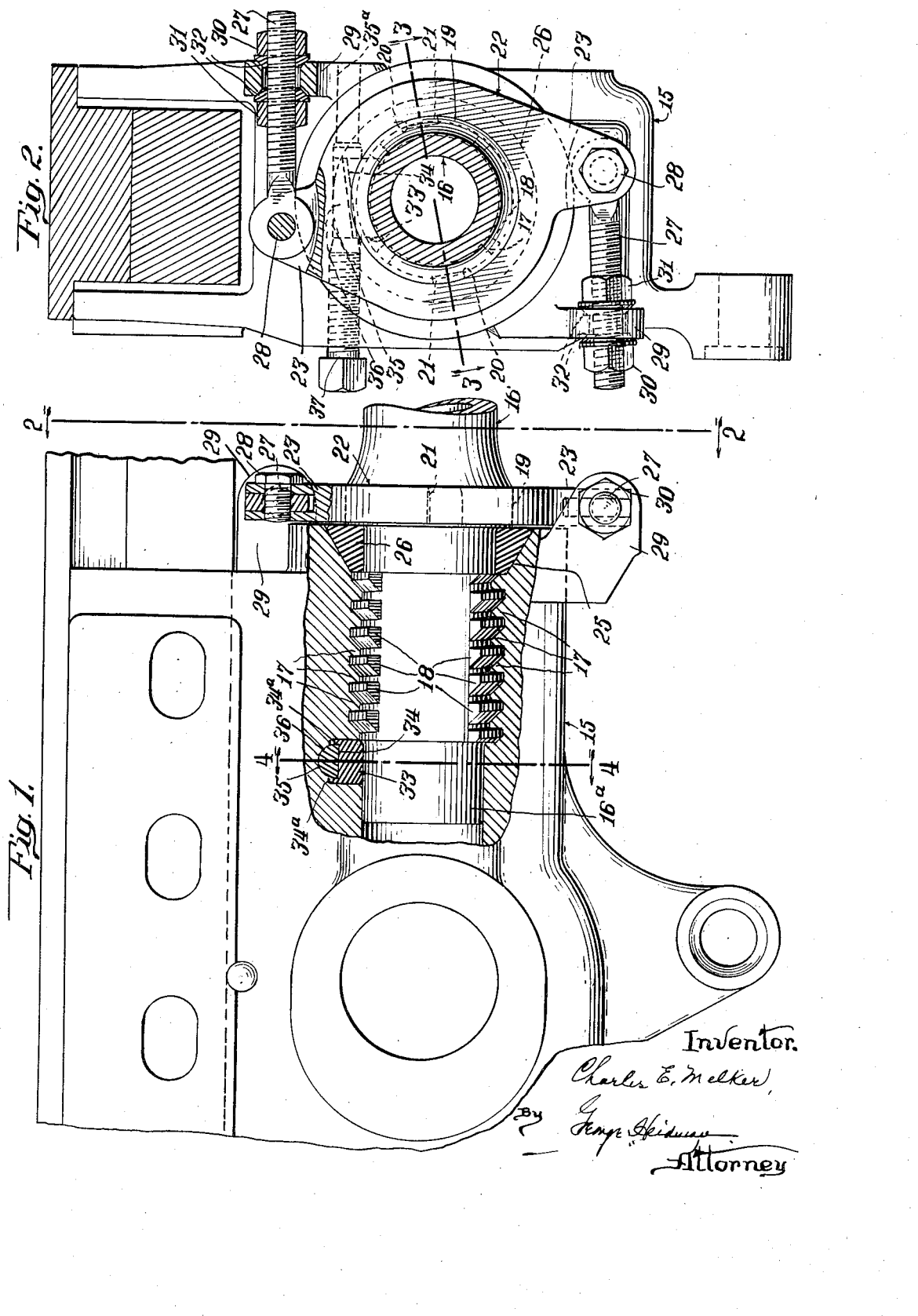
Inventor.
Charles E. Melker,
By George Heidman
Attorney Feb. 18, 1941.  C. E. MELKER  2,232,182
CROSSHEAD AND PISTON ROD CONNECTION
Filed July 3, 1939  2 Sheets-Sheet 2
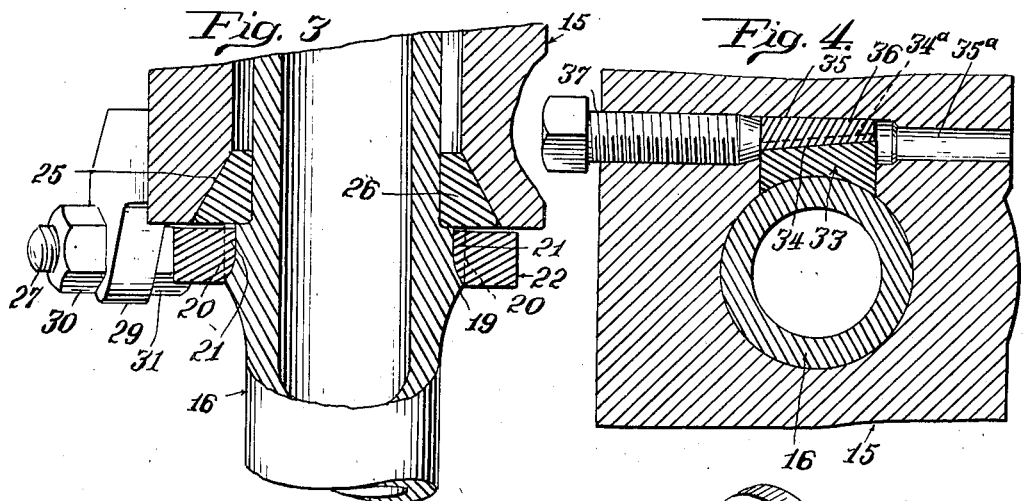
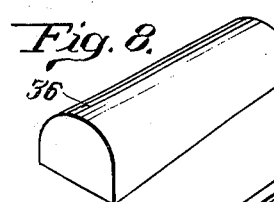
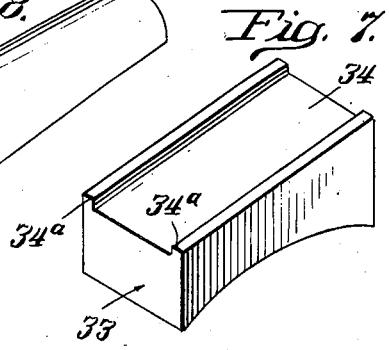
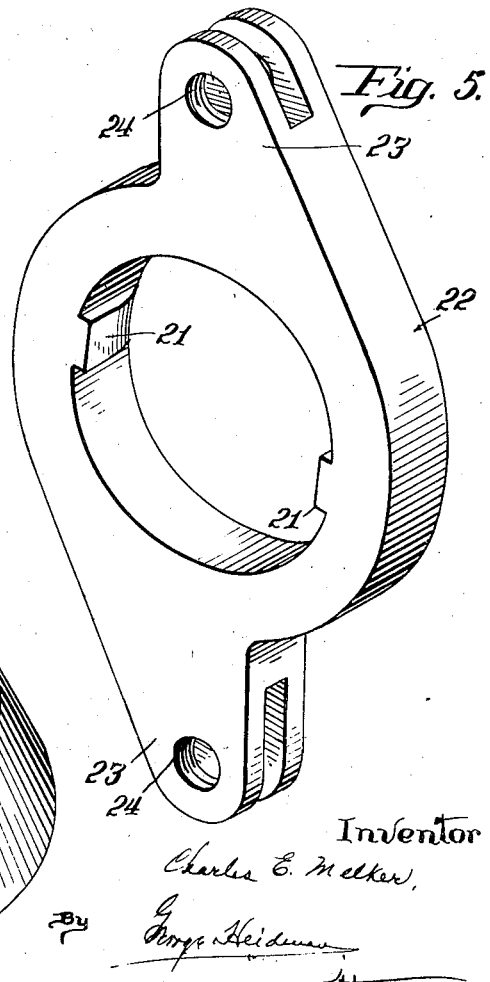
Inventor
Charles E. Melker,
By George Heideman
Attorney Patented Feb. 18, 1941

2,232,182

UNITED STATES PATENT OFFICE 2,232,182

CROSSHEAD AND PISTON ROD CONNECTION

Charles E. Melker, Lincoln, Nebr.

Application July 3, 1939, Serial No. 282,626

5 Claims. (Cl. 287—20)

My invention relates to a lock type connection between the crosshead and the piston rod of a steam locomotive and has for its object the provision of a construction adapted to eliminate the fracturing of breaking difficulties encountered in connections between the crosshead and the piston rod as at present effected and to provide a connection whereby a tight hold on the rod where it encounters the crosshead is provided with the result that any weaving action during reciprocation of the piston and crosshead will be prevented and consequently breakage of the rod at its point of connection with the crosshead (where breakage frequently occurs) will also be prevented.

My invention also contemplates locking means between the crosshead and the piston rod at what is called the back end, namely adjacent the immediate end of the piston rod located within the hub portion of the crosshead where breakage also frequently has occurred; this locking means effecting a tight gripping relation with the rod which will prevent any weaving or motion of the inner end of the rod.

The object of my invention is to provide a lock type connection which, although especially designed for hollow piston rods, is equally well adapted for use with a solid piston rod; and while, for purposes of exemplification, my improved lock type connection has been illustrated in connection with a type of connection substantially similar to that disclosed in my Patent No. 1,997,884, the invention may be used with the various types of construction at present in use and particularly with cross-head and piston rod connections which do not employ crosshead keys which latter are not adaptable to hollow piston rods; the invention providing a permanently tight relation between the crosshead and piston rod which positively prevents any weaving action and hence prevents the development of fractures in the piston rod encountered in constructions at present employed.

Another object of the invention is the provision of means which may be easily applied to existing structures without the necessity for material alteration.

The foregoing enumerated objects and advantages, as well as other advantages inherent in the invention, will all be readily comprehended from the following detailed description of the accompanying drawings wherein—

Figure 1 is a side elevation of a portion of a crosshead and of a piston rod, with the piston rod receiving portion of the crosshead and my improved locking elements shown in section.

Figure 2 is a sectional elevation taken on the line 2—2 of Figure 1 as indicated by the arrows.

Figure 3 is a cross sectional view taken substantially on the line 3—3 of Figure 2, looking in the direction of the arrows.

Figure 4 is a cross sectional view taken on the line 4—4 of Figure 1 viewed as indicated by the arrows.

Figure 5 is a detail perspective view of the piston rod controlling collar.

Figure 6 is a detail perspective view of my improved joint forming ring.

Figures 7 and 8 are perspective views of my improved locking means employed at the rear or inner end of the piston rod.

For purposes of exemplification I have illustrated my invention applied to a crosshead 15 and a piston rod 16 provided with interrupted matching spiral threads 17 and 18, respectively, for effecting interengaging relation in a manner substantially similar to that shown in my Patent Number 1,997,884, with the thread portions of the respective groups aligned longitudinally of the piston rod.

The piston rod 16 is provided with an annular shoulder 19 which is disposed in close juxtaposition with the threaded bore of the crosshead. The shoulder 19 at diametrically opposite points is provided with notches 20, see Figure 3, which are adapted to receive matching projections 21, 21 formed on the inner diameter of the collar 22, see Figure 5. The collar 22 is adapted to fit on the shoulder 19 of the piston rod and is provided with the radially or outwardly extending arms 23, 23 slotted or bifurcated at their ends and provided with transversely disposed bolt-holes 24.

The orifice of the bore in the crosshead is tapered as shown at 25 to receive a matching portion on the piston rod which is preferably shown in the nature of a truncated cone-shape two piece ring 26 shown in detail in Figure 6. This two-piece ring, as shown in Figures 1 and 3, is applied to the piston rod with its base portion butting up against the shoulder 19 of the piston rod; and although the tapered surface may, if desired, be formed integral with the shoulder 19, a firmer gripping relation with the piston rod is believed possible with the tapered surface made separate of the piston rod shoulder and in the nature of a two-piece ring as shown.

The bifurcated arms 23, 23 of the collar 22 are each provided with an eye-bolt 27 pivotally secured thereto by suitable bolts or pins 28; and the threaded ends of the bolts 27 are disposed through openings arranged in the lobes or extensions 29, 29 formed on the crosshead 15; the relation between the crosshead 15 and the collar 22 (and therefore also of the piston rod because of the interengaging notches and projections 20, 21) being maintained by the nuts 30, 31 threaded on each bolt 27 and on opposite sides of the lobes or extensions 29, as more clearly shown in Figure 2.

The piston rod 16 is inserted into the bore of the crosshead until the immediate unthreaded end 16ª of the rod is beyond the threaded portion of the bore in the crosshead; such insertion being possible by having the interrupted threads 18 of the piston rod disposed in alignment with the spaces between the sections of threads 17 of the crosshead. This piston rod is then twisted or turned on its axis until its thread sections 18 engage the thread sections 17 of the crosshead and by reason of their interengagement draw the piston rod into the crosshead and provide a firm relation between the crosshead and piston rod, causing the shoulder 19 of the piston rod to press the beveled ring 26 into the beveled orifice of the bore in the crosshead. It is apparent that the farther the piston rod is forced into the crosshead the firmer the gripping relation between the piston rod and the beveled ring 26 becomes and the weaving action that has heretofore been encountered will be prevented due to the contraction of the two piece ring onto the piston rod and the firm wedging relation between the beveled surfaces of the ring and the bore of the crosshead.

In order to maintain this firm relation, the bolts 27 are then inserted in the apertures of the crosshead lobes or extensions 29 and drawn up tightly by screwing up the outer nuts 30. After the nuts 30 have been screwed up completely, nuts 31 are then screwed up tightly into firm relation with the inner faces of the lobes or extensions 29; a gripping relation with the extensions 29 being effected by the tapered washers, shown at 32 to the right in Figure 2, which prevent the nuts from "backing" away.

As is apparent, when the locked relation between the crosshead and piston rod has been established by the bolts and nuts 27, 30, 31, it will be impossible for the screwing interengaging relation between crosshead and piston rod, as well as the tapered gripping relation between crosshead and piston rod, to loosen during the reciprocation of piston and crosshead and hence the breakage or fractures which frequently occur in the piston rod at the point where it enters the bore in the crosshead will be prevented.

In view of the difficulties that have been encountered due to the up and down weaving motion between the crosshead and piston rod and to assist the binding relation obtained by my improved means at the forward end or juncture between the crosshead and the piston rod, I also have devised means whereby a second binding point between crosshead and piston rod is provided, namely adjacent the back end of the piston rod beyond its threaded engagement with the crosshead; this second binding relation being effected by elements shown in detail in Figures 7 and 8 and shown applied in Figures 1, 2 and 4.

The element 33, Figure 7, is in the nature of a saddle which increases in thickness toward one end and has a sloping plane upper surface 34, while the other or lower surface is arcuate and of the proper radius in keeping with the piston rod on which the arcuate lower surface rests; it being understood that the crosshead 15 is provided with a suitable recess, immediately above the piston rod receiving bore, to receive the saddle 33 which is placed in the recess before the end of the piston rod passes beneath the recess or socket.

The crosshead 15 is provided with a transversely disposed hole 35 in a plane slightly above that of the saddle receiving portion of the recess so as to intersect the upper end of the latter; the larger end of the hole 35 being threaded substantially to the point of intersection while the other end at the opposite side of the saddle receiving recess is preferably reduced as shown at 35ª in Figure 4.

The tappet larger end of the hole 35 in the crosshead is large enough to receive the small tapered key element 36, Figure 8, shown arcuate on its upper surface to approximate the curvature of the hole 35 in the crosshead, while the lower surface is plane and is intended to ride on the upper plain surface of the saddle element 33; it being understood that the saddle and key elements are of small dimensions. In order to maintain the key element centrally on the saddle element, the latter is shown preferably provided with the upstanding longitudinal flanges 34ª.

The small end of the key element 36 is inserted in the hole 35 and the key element forced to ride up on the upwardly inclining surface 34 of the saddle element 33 by screwing bolt 37 into the tappet end of hole 35, see Figure 4, which causes a great pressure on the saddle element, forcing it downwardly on the end of the piston rod, effecting a binding non-yielding relation between the crosshead and the end of the piston rod which prevents any motion or weaving at the inner end of the piston rod during service.

Should occasion require the removal of the piston rod from the crosshead, the binding relation between the piston rod and the saddle element 33 may be readily relieved by inserting a suitable tool or drift pin through the reduced end 35ª of the hole 35 in the crosshead—after having removed the set-screw or bolt 37—into contact with the small end of the key element 36 and then subject the drift pin to hammer blows, inducing the key element to move through the larger tappet end of the hole 35. After the binding relation effected by the key and saddle 36, 33 has been released, the outer forward gripping relation produced by the tapered portions 25, 26 may then be released by first unscrewing the inner nuts 31 and then the nuts 30, which permits the bolts 27 to be removed from the sockets in the crosshead extensions 29 and perimeter collar 22 with its lugs 21 to be slid off the shoulder 19 of the piston rod. This will permit the piston rod to be given a partial turn and enable its threaded segments to be moved into alignment with the spaces between the threaded segments of the crosshead.

In addition to providing a suitable keyless connection between crosshead and piston rod—hence a connection especially adapted to hollow piston rods—my invention is designed to prevent any motion or weaving between crosshead and piston rod which frequently causes breaking or fracturing of the piston rod adjacent to the crosshead, resulting in locomotive service loss.

For purposes of exemplification, I have illustrated my invention in connection with the threaded interengaging connection between the crosshead and the piston rod and also with a hollow piston rod to which it is specially adapted. It will be understood, however, that the invention is equally well adapted to other types of construction and also to solid piston rods; and although the binding surfaces between the cross head and the outer end of the piston rod has been shown provided by a separate two piece ring, it is apparent that this might be accomplished by providing the piston rod shoulder 19 with a tapered side; that is to say, by forming the tapered element or portion 26 integral with the shoulder of the piston rod.

I, therefore, do not wish to be limited to the exact embodiments shown and described, as modifications are possible and may be made without, however, departing from the spirit of my invention as defined by the appended claims.

What I claim is:

1. In a crosshead and piston rod connection, a crosshead provided with a piston rod receiving bore beveled at its outer end and having a recess adjacent its inner end, with a transversely disposed hole intersecting said recess; a piston rod provided with an annular enlargement having a beveled surface matching the beveled end of said crosshead bore; interengaging wedge elements arranged in said recess and hole whereby a binding relation between the inner end of the piston rod and the crosshead is effected.

2. A crosshead and piston rod connection comprising, in combination with a piston-rod, a crosshead provided with a piston rod receiving bore and a recess communicating with the bore; a saddle and wedge key arranged in said recess with the saddle disposed transversely on the piston rod; and means arranged in the crosshead whereby the relation between the saddle and wedge key may be controlled and a binding relation between the crosshead and piston rod effected.

3. A crosshead and piston rod connection comprising, in combination with a crosshead having a piston rod receiving bore and a recess communicating with said bore; a saddle member arranged in said recess transversely of the bore and having an arcuate surface for engagement with the piston rod while the opposite surface is inclined; a wedge key with a tapered surface to match the inclined surface of said saddle member while the opposite surface matches the contour of said recess; and adjustable means disposed transversely of the crosshead in engagement with said wedge key whereby the relation between the saddle member and said wedge key is controlled and the saddle member forced into gripping relation with the piston rod.

4. A crosshead and piston rod connection comprising a crosshead provided with a piston rod receiving bore having a beveled orifice at the outer end and a recess adjacent the inner end communicating with the bore; a saddle member and a wedge key arranged in said recess; an adjustable element disposed transversely of the crosshead and in engagement with said wedge key; in combination with a piston rod provided with an annular shoulder and a beveled surface matching the beveled orifice of the crosshead bore and means whereby relative rotative movement between the crosshead and piston rod is prevented.

5. In a crosshead and piston rod connection, a crosshead provided with a piston rod receiving bore and a transversely disposed hole, enlarged intermediate of its ends, with said enlarged portion intersecting said bore; a pair of oppositely tapered elements arranged in superposed relation in the enlarged portion of said hole with the lower element in engagement with the inner end of said rod and held against movement transversely of the crosshead; and adjustable means arranged in one end of said hole adapted to force the upper element across the top of the lower element and thereby force the latter into binding engagement with the piston rod.

CHARLES E. MELKER.